United States Patent
Shiraishi

(10) Patent No.: US 7,884,169 B2
(45) Date of Patent: Feb. 8, 2011

(54) THERMOPLASTIC CELLULOSE COMPOSITION, METHOD FOR PRODUCING THE SAME, AND MOLDED PRODUCT USING THE SAME

(75) Inventor: Nobuo Shiraishi, 13-3, Shimogamoinokoda-cho, Sakyo-ku, Kyoto-shi, Kyoto 606-0834 (JP)

(73) Assignees: Agri Future Joetsu Co., Ltd, Niigata (JP); Nobuo Shiraishi, Kyoto (JP)

( * ) Notice: Subject to any disclaimer, the term of this patent is extended or adjusted under 35 U.S.C. 154(b) by 306 days.

(21) Appl. No.: 11/630,383

(22) PCT Filed: Jun. 25, 2004

(86) PCT No.: PCT/JP2004/009407

§ 371 (c)(1), (2), (4) Date: Apr. 10, 2008

(87) PCT Pub. No.: WO2006/001076

PCT Pub. Date: Jan. 5, 2006

(65) Prior Publication Data

US 2008/0306235 A1    Dec. 11, 2008

(51) Int. Cl.
*C08G 63/00* (2006.01)
(52) U.S. Cl. .................................... 527/311
(58) Field of Classification Search ............ 527/311
See application file for complete search history.

(56) References Cited

U.S. PATENT DOCUMENTS 4,888,403 A    12/1989  Ueda et al.

FOREIGN PATENT DOCUMENTS

| JP | 60-083806 A | 5/1985 |
| JP | 63-183910 A | 7/1988 |
| JP | 64-036653 A | 2/1989 |
| JP | 1-58208 B2 | 12/1989 |
| JP | 04-078501 A | 3/1992 |
| JP | 4078501 | 3/1992 |
| JP | 07-292001 A | 11/1995 |
| JP | 2661779 B2 | 6/1997 |
| JP | 11-255801 A | 9/1999 |
| JP | 11-255870 A | 9/1999 |
| JP | 2000-169594 A | 6/2000 |
| JP | 2003-206348 A | 7/2003 |

OTHER PUBLICATIONS

Dr. Mariko Yoshioka, "Biodegradable Plastics From Cellulose and Lignocellulosics", Biopolymers vol. 9, Steinbuhel A. & Matsumura S. (eds.), pp. 201-235, Wiley-VCH, Weinheim, Germany 2003.
Mariko Yoshioka et al. "Biodegradable Plastics From Cellulose", Mol. Cryst. And Liq. Cryst., 2000, vol. 353, pp. 59-73.

*Primary Examiner*—Ling-Siu Choi
*Assistant Examiner*—Sonya Wright
(74) *Attorney, Agent, or Firm*—Arent Fox, LLP

(57) ABSTRACT

A method for producing a thermoplastic cellulose composition according to the present invention includes a process of ring-opening polymerization of cyclic ester with a cellulosic material or oligoesterified cellulose after mechanochemical pretreatment or during mechanochemical treatment, to improve thermoplasticity of the resultant thermoplastic cellulose composition.

4 Claims, No Drawings

THERMOPLASTIC CELLULOSE COMPOSITION, METHOD FOR PRODUCING THE SAME, AND MOLDED PRODUCT USING THE SAME

CROSS-REFERENCE TO RELATED APPLICATION

This application is a National Stage entry of International Application No. PCT/JP2004/009407, filed Jun. 25, 2004, the entire specification claims and drawings of which are incorporated herewith by reference.

TECHNICAL FIELD

The present invention relates to a thermoplastic cellulose composition used as a hot-press molding material.

BACKGROUND ART

Recently, recycling technology has been developed in various fields from the viewpoint of building "resource recycling-oriented society". In the fields related to woody material, such as thinned wood, waste wood remaining in forest land, scrap wood generated in wood processing industry (e.g. wood powder and listings) and building demolition materials, a technique has been drawn attention which provides a woody material with hot-press moldability that cellulose forming woody material does not inherently have, in order to promote use of these waste biomass. It is expected that, if a woody material is provided with thermal or pressure plasticity (hot-press fluidity), the woody material has plastic processability of processing/molding in desired shapes, so that new application fields will be developed.

As a technique for imparting hot-press moldability to a woody material, the present inventors have developed a technique in which cellulose diacetate and an acetylated woody material are oligoesterified (for example, see M. Yoshioka "Biodegradable Plastics from Cellulose and Lignocellulosics", "Biopolymers Vol. 9", Steinbuhel A. & Matsumura S. (eds.), p. 201-235, Wiley-VCH, Weinheim, Germany, 2003; M. Yoshioka and N. Shiraishi: Biodegradable Plastics from Cellulose, Mol. Cryst. and Liq. Cryst., 353, p. 59-73 (2000)).

However, the conventional techniques for imparting hot-press moldability to the woody material have problems in that profitability in industrial scale manufacture is poor, since cellulose diacetate, which is an expensive material, is used and a product becomes expensive.

On the other hand, a conventional technique in which cellulose and a woody material are oligoesterified for plasticizing can use cheap biomass materials, such as wood powder, and can manufacture industrial products in a small scale on an economically viable basis.

As for a technique to oligoesterify the woody material, there can be mentioned, for example, an invention disclosed in Japanese unexamined patent publication Kokai No. 60-83806 entitled "Method for producing modified wood chips". According to this conventional technique, dibasic acid anhydride and monoepoxy compound are subjected to addition-esterification with wood chips to thereby obtain modified wood chips, and the resultant modified wood chips are subjected to hot-press processing, to thereby obtain a khaki-colored sheet or board having a hardened surface with excellent thermal resistance and water resistance. However in this conventional technique, it is necessary to add a cross-linking agent which functions also as a plasticizer, and to conduct hot-press processing at a high temperature of 180° C.-200° C. or more under a high pressure of 300 kg/cm$^2$ or more, in order to form modified wood chips. The molding temperature that exceeds 180° C. is not preferred, since it initiates thermal decomposition of the woody material, resulting in poor quality of the product and poor energy efficiency in production.

Japanese examined patent publication kokoku No. 1-58208 entitled "method for producing plastic-like woody molded product" discloses the following technique. First, woody material is subjected to addition-esterification with polybasic acid anhydride and monoepoxy compound having unsaturated double bond, to thereby obtain an oligoesterified cellulose (a). An oligomer (b) is also obtained from polybasic acid anhydride and monoepoxy compound having unsaturated double bond. To a composition including the oligoesterified cellulose (a) and the oligomer (b) obtained as such is added a small amount of a radical polymerization initiator, if necessary, and the composition is subjected to hot-press molding where plasticization and cross-linking by polymerization of double bond are performed at the same time to thereby obtain a molded product. The thus-obtained plastic-like woody molded product is excellent in physical properties, such as dimensional stability, mechanical property and thermal deformation temperature.

However, in the plastic-like woody molded product according to this conventional technique, cross-linking is conducted by polymerization of double bond during molding. Therefore, after this molding, if hot-press molding is repeated again, the product cannot be plasticized any more, and thus cannot be recycled.

Moreover, Japanese Patent No. 2661779 entitled "thermoplastic woody composition for molding and method for producing the same" discloses a technique in which, when a woody material component is subjected to addition-esterification with polybasic acid anhydride and monoepoxy compound, a composition for molding is obtained by terminating reaction while unreacted polybasic acid anhydride and/or monoepoxy compound remain. According to this technique, there is provided a feature in which even a molded product that has once undergone hot-press molding can be recycled through hot-press molding, when the molded product is powdered and polybasic acid anhydride and/or monoepoxy compound are added thereto.

However, in the thermoplastic woody composition for molding according to this conventional technique, hot-press molding conditions (temperature, pressure and the like) for obtaining a desired hot-press fluidity (thermoplasticity) does not reach sufficiently low temperature and pressure regions.

For plasticizing techniques to improve this hot-press fluidity, there have been widely known a method in which a low-molecular plasticizer is used, a method in which a high-molecular plasticizer is used, a method of intramolecular plasticization, such as introduction of substituent, and the like. Specifically, it has been known that, as a modified method using a low-molecular plasticizer, use of bisphenol A diglycidyl methacrylate as a plasticizer improves a fluidity and thus moldability. However, some plasticizers are suspected as endocrine-disrupting chemicals (what is called "environmental hormone") and thus it is not desirable to use such a plasticizer.

In the conventional techniques mentioned above, the reason for a poor hot-press fluidity (thermoplasticity) of oligoesterified woody material (cellulosic material) is believed to be as follows. In the conventional oligoesterification, polymerization does not reach a core of a cellulose crystal in a starting material, so that unreacted portions remain as a tangled form. In other words, since the oligoester substituents are locally densely present in the woody material or an amorphous portion of cellulose, a satisfactory hot-press fluidity (thermoplasticity) cannot be obtained in the conventional thermoplastic cellulose composition.

DISCLOSURE OF THE INVENTION

The present invention is made with the view towards solving the above-mentioned problems in the conventional techniques, and has a configuration disclosed in claims 1 to 4. According to the configuration, the present invention is completed by focusing on homogeneously introducing a polymerizable compound, such as oligoester substituent, to a woody material (cellulose material) as a starting material, or on eliminating a core of the crystal instead of introducing substituent to amorphous portion.

According to the present invention, even though a woody material (cellulose material) is highly contained, the woody material component is plasticized under the hot-press molding at a relatively low temperature under a low pressure for a short period of time, with an excellent hot-press fluidity. Moreover, there can be provided a thermoplastic woody composition for molding that can be recycled by powdering and re-molding it, even though it has undergone the hot-press molding to form a molded product; and also a technique for producing the composition advantageously used in industrial production is provided.

BEST MODE FOR CARRYING OUT THE INVENTION

First Embodiment

A method for producing a thermoplastic cellulose composition according to a first embodiment of the present invention will be described below.

First, a cellulose material to be used in the present embodiment includes, in addition to woody material, any kind of cellulose material obtained in pulp industry and the like (e.g. cellulose pulp, cotton and linter).

There is no limitation in types of raw wood and tree species for the woody material, and there can be mentioned crushed wood, such as wood powder, wood fibers and wood chips; plant fibers that are discarded in a large amount without being utilized, such as straw, rice straw, chaff, waste paper and sugarcane trash; and crushed lignocellulose material which is mainly composed of other types of cellulose and lignin. In addition, there can be mentioned wood chips and sawdust generated as industrial waste byproduct in industry using woods; and sander powder generated during production of particleboard, fiberboard and the like.

These woody material components are crushed into wood chips, wood fibers or fine wood powder and the like by a crusher, a Henschel mixer and the like. When a water content of the components is high, it is preferred that the components be dried with a hot air drier, a vacuum drier and the like to remove water so as to make the water content 10% or less. The woody material component with a high water content is not preferred, since excessive water reacts with acid anhydride moiety and polyvalent carboxylic acid is generated as byproduct.

Examples of the polybasic acid anhydrides also used in the present invention include maleic anhydride, succinic anhydride, phthalic anhydride, hexahydrophthalic anhydride, tetrahydrophthalic anhydride, dichloromaleic anhydride, itaconic anhydride, tetrabromophthalic anhydride, HET anhydride, trimellitic anhydride and pyromellitic anhydride. Among these, maleic anhydride, succinic anhydride and phthalic anhydride which are industrially and cost-wise advantageous are especially preferred.

With respect to the monoepoxy compound also used, there is no limitation as long as the compound includes one epoxy group in a molecule. The examples include phenyl glycidyl ether, allyl glycidyl ether, stylene oxide, octylene oxide, methyl glycidyl ether, butyl glycidyl ether and cresyl glycidyl ether.

Next, a general production method of oligoesterified cellulose will be described. First, in a presence of the cellulose material, the polybasic acid anhydride and the monoepoxy compound are mixed to allow a reaction to proceed at 60-150° C. for 0.5-8 hours.

In this event, addition-esterification in which the polybasic acid anhydride and the monoepoxy compound are alternately added to hydroxyl groups of the woody material component sufficiently proceeds even when a catalyst is not present. However, in order to promote the reaction, a basic catalyst, such as sodium carbonate, dimethylbenzylamine, tetramethyl ammonium chloride and pyridine, may be used. Alternatively, an addition-esterification catalyst may be used.

It is preferred that a molecular weight of oligomers of the polybasic acid anhydride and the monoepoxy compound be approximately 20-1,000, which indicates the oligomer is in a form of fluid (polymerization degree is preferably 5 or less, including 1), from the viewpoint of usability and effect.

Amounts of the polybasic acid anhydride and the monoepoxy compound are as follows. First, the polybasic acid anhydride is used in an amount of 5-120 parts by weight, preferably 10-100 parts by weight, relative to 100 parts by weight of the dried woody material component. It is preferred that the monoepoxy compound be used in an amount of 0.5-2.0 equivalents in terms of epoxy group, relative to 1 equivalent of acid anhydride moiety of the polybasic acid anhydride to be used. The reasons are as follows: it is not preferable that, when 120 parts by weight or more of the polybasic acid anhydride is used relative to 100 parts by weight of the dried woody material component, a content of the woody material component becomes low and thus bleeding easily occurs in hot-press molding; and it is not preferable that, when less than 5 parts by weight of the polybasic acid anhydride is used, a hot-press fluidity decreases, and thus further, a homogeneously molded product cannot be obtained.

The amount ratio of the polybasic acid anhydride and the monoepoxide is determined based on meeting a requirement in molecular design whether an introduced ester chain terminal should be a carboxyl group or a hydroxyl group, and on the fact that introduced oligoester chain is not necessarily to be elongated.

Next, polymerization, desirably in-situ graft polymerization, is conducted using the above-described oligoesterified cellulose as a starting material and a polymerizable compound.

For the polymerizable compound, cyclic ester can be mentioned, and there is no limitation as long as it can undergo ring-opening polymerization. Examples include lactones, such as β-propiolactone, δ-valerolactone, ε-caprolactone, α,α-dimethyl-β-propiolactone, β-ethyl-δ-valerolactone, α-methyl-ε-caprolactone, β-methyl-ε-caprolactone, γ-methyl-ε-caprolactone, 3,3,5-trimethyl-ε-caprolactone and enantholactone, and lactides.

Among these, ε-caprolactone and lactides are preferable, since they are industrially available, relatively reasonable, and have excellent compatibility with oligoesterified cellulose. Two or more of these cyclic esters may be blended.

It is desired that the blend amount of the cyclic ester be 99-15 weight %, relative to 1-85 weight % of the oligoesterified cellulose. When a feed amount of the oligoesterified cellulose having hydroxyl group is more than 85 weight %, a viscosity of a reaction system becomes extremely high and thus handling becomes difficult. When the feed amount is less than 1 weight %, the amount of utilized biomass becomes extremely small.

In-situ graft polymerization may be conducted while kneading using a blender, a kneader, a mixing roll, a Banbury mixer and the like. However, if mechanochemical treatment is conducted prior to or together with kneading, polymerization with molecular order closer to homogeneity can be attained. Conducting such homogeneous polymerization improves thermoplasticity (hot-press fluidity) of the resultant thermoplastic cellulose composition.

An operation of the mechanochemical treatment will be described below. The term "mechanochemical treatment" means a treatment in which a woody material is finely crushed while at the same time a reactive compound is introduced into a cellulosic crystal by collision or decrystallization is promoted, with a use of a medium type crusher, such as a planetary ball mill, a bead mill and a wet vibratory ball mill; a mediumless granulator, such as a nanomizer and a wet granulator; and a dry mechanical compositing device, such as a mechanofusion.

To sum up, when the mixture of one or more of cyclic ester containing lactide with the oligoesterified cellulose is subjected to mechanochemical treatment, the oligoesterified cellulose is crushed into grains or fibrillated to thereby have an increased surface area. In addition, the following mechanochemical reaction progresses. Briefly, a crystalline structure of the oligoesterified cellulose undergoes shear deformation due to impact, and the cyclic ester is introduced into the crystalline structure by collision. Alternatively, due to the impact, the crystalline structure is lost to thereby form tighter composites with the cyclic ester.

During or after mechanochemical treatment, polymerization, preferably in-situ graft polymerization, is conducted.

In general, examples of compounds to be used as a catalyst for graft polymerization of oligoesterified cellulose having hydroxyl group with lactones are catalysts generally used for ring-opening reaction of cyclic ester, and include alkali metal, such as sodium and potassium, and derivatives thereof, such as alkoxyde thereof; alkylaluminum and derivatives thereof including triethylaluminum; organometallic compound, such as alkoxy titanium compound (e.g. tetrabutyl titanate), tin octylate and dibutyltin laurate; and metal halide, such as tin chloride. In a case where in-situ polymerization is selected for efficiently performing selective graft polymerization to hydroxyl group position to cellulose-acetate, tin(II) octylate is preferred.

A polymerization temperature to obtain graft polymer is a temperature generally used for ring-opening polymerization of cyclic ester, and preferably 100-210° C. With respect to a reaction time, there is no limitation and it depends on types of the oligoesterified cellulose having hydroxyl group, types of lactones, feed ratio, types and amount of catalyst, reaction temperature, as well as reaction device. However, the reaction time of 1 hour or less is enough.

Especially in a case where a reactive processing device, such as biaxial extrude, is used for reaction together with a vacuum distillation recovery device for collecting unreacted monomers, the reaction time can be remarkably reduced equal to or less than 6 minutes. When obtaining the graft polymer of the present invention, it is preferred that the material and the reactor be dried well in advance.

When a viscosity of the system is too high, the viscosity is generally required to be reduced so that the system can be easily handled, but even at a high viscosity, handling under reactive processing is effective. When handling is still difficult, an auxiliary third component can be added, such as: an organic solvent having no active hydrogen which is compatible with oligoesterified cellulose or with both oligoesterified cellulose and cyclic ester; and a polyhydric alcohol having reactivity therewith.

The reaction product obtained as a result of the above-mentioned reaction may contain graft polymer of the oligoesterified cellulose, unreacted oligoesterified cellulose, and homopolymer of the cyclic ester. In this case, even though a compatibility of the unreacted oligoesterified cellulose and the homopolymer of the cyclic ester is poor, the graft polymer acts as a mediator (compatibilizer) providing compatibility therebetween, and thus an appearance of the resin is homogeneous.

One effect of adding the cyclic ester to the oligoesterified cellulose is to plasticize inside of the oligoesterified cellulose to thereby lower a thermal fluid temperature, and at the same time, to increase a decomposition temperature. Therefore, even when a resin that seems to have a high-melting point is synthesized, molding can be conducted without adding a large amount of a plasticizer, by a molding means used for general processing of thermoplastic resin, such as injection molding, extrusion molding and press molding.

With respect to the oligoesterified cellulosic thermoplastic molded product with the inside thereof being plasticized with the cyclic ester, the oligoesterified cellulose has biodegradability, and polycaprolactone generated by polymerization of chemical species added by grafting also has biodegradability.

When the thus obtained thermoplastic woody composition for molding according to the present invention is subjected to hot-press molding to obtain a molded product, press molding, extrusion molding, injection molding and the like can be used under the following conditions: molding temperature from room temperature to 180° C., and molding pressure of 20-250 kg/cm$^2$.

Moreover, even though the molded product has undergone hot-press molding, it can regain thermoplasticity and be recycled, when the molded product is crushed into powder and polybasic acid anhydride and/or monoepoxy compound is again introduced thereto.

As a modified embodiment of the first embodiment, oligoesterified cellulose can be produced using polyhydric alcohol, instead of using the monoepoxy compound as explained above.

The examples of the polyhydric alcohol to be used include ethylene glycol, propylene glycol, trimethylene glycol, 1,4-butanediol, 1,5-pentanediol, 1,6-hexanediol, 1,7-heptanediol, 1,8-octanediol, 1,9-nonanediol, 1,10-decanediol, pinacol, hydrobenzoin, benzopinacol, cyclopentane-1,2-diol, cyclohexane-1,2-diol, cyclohexane-1,4-diol, glycerine and polyethylene glycol 400.

Second Embodiment

In the first embodiment, the polymerizable compound (cyclic ester) is polymerized with the oligoesterified cellulose, while in the second embodiment, the polymerizable compound is directly polymerized with the cellulosic material after mechanochemical pretreatment or during mechanochemical treatment. In this manner, even when the cellulosic material is not oligoesterified and used directly, decrys tallization or fibrillation is promoted by mechanochemical treatment, and therefore, polymerization of the polymerizable compound homogeneously progresses throughout the cellulose at a molecular level. As a result, unreacted parts in a tangled form that hinders a hot-press fluidity (thermoplasticity) is absent, and thus the thermoplastic cellulose composition exhibits an excellent thermal fluidity.

Example 1

Hereinbelow, the present invention will be specifically described with reference to Examples. In each Example, wood powder to be used was dried so that a water content became 5% or less. It should be noted that the present invention should not be construed as being limited by the following Examples.

An acid anhydride value of an oligoesterification product was obtained from a difference between an aqueous acid value and a nonaqueous acid value. The aqueous acid value was obtained by: dispersing approximately 0.3 g of a sample precisely weighed into a mixed solvent of 30 mL of acetone and 10 mL of ion-exchange water; allowing the dispersion to stand still in a room for 20 minutes; and titrating the dispersion with 0.1 N KOH—$H_2O$. The nonaqueous acid value was obtained by: dispersing approximately 0.3 g of the sample precisely weighed into 30 mL of acetone and titrating the dispersion with 0.1N KOH-methanol.

An epoxy value was obtained in the following manner. To approximately 0.3 g of the sample precisely weighed, 7 mL of 0.1 N HBr-acetic acid solution was added and the mixture was allowed to stand in a room for 20 minutes. Subsequently, 10 mL of 0.1 N phenylallyl glycidyl ether-chlorobenzene solution was added, and the mixture was further allowed to stand in a room for 20 minutes. Then, the resultant mixture was titrated with 0.1 N HBr-acetic acid solution. The obtained value was used for the epoxy value.

Hot-press molding of the oligoesterified woody material and the oligoesterified cellulose was conducted at 170° C. under a pressure of 100 kg/cm$^2$ for 30 minutes. Appearance of the resultant sheet (with thickness of approximately 0.6 mm) was observed, and semi-transparent appearance was determined as plasticized, while opaque appearance was determined as nonplasticized.

Hot-press fluidities of the oligoesterified woody material and the oligoesterified cellulose were obtained by: sandwiching 5.0 g of the sample between steel plates; subjecting the sandwiched sample to pressing at 150° C. under a gauge pressure of 75 kg/cm$^2$ for 2 minutes with a pressing machine having a ram diameter of 30 cm; and measuring a spread area of the woody material.

With respect to a final product obtained by having the oligoesterified woody material or the oligoesterified cellulose swollen with a reactive monomer, such as cyclic ester, or by subjecting them to mechanochemical treatment in a presence of the reactive monomer and then to polymerization, such properties as a degree of decrystallization, a glass-rubber transition temperature Tg and thermostabilization for each sample were evaluated by X-ray diffraction, differential scanning calorimetry (DSC) and the like. In addition, hot-press moldability of each sample was evaluated under the conditions including a molding temperature, a closing pressure of 100 kg/cm$^2$ and closing time of 30 minutes which were determined by the properties evaluated above.

TABLE 1

Feed composition of agent for oligoesterifying wood and properties of produced oligoesterified wood

| Code for produced oligo-esterified wood | Reactant composition (wt %) | | | Product characteristics | | |
|---|---|---|---|---|---|---|
| | Wood powder | Maleic an-hydride | Allyl glycidyl ether | Acid value eq/kg | Epoxy value eq/kg | Average length of oligoester chain |
| OEW45 | 100 | 48.6 | 73.6 | 0.395 | 0.190 | 2.1 |
| OEW60 | 100 | 26.5 | 40.1 | 0.370 | 0.242 | 1.7 |
| OEW75 | 100 | 13.3 | 20.1 | 0.461 | 0.320 | 1.4 |

In amounts shown in Table 1, dried wood powder (product name: LIGNOCEL, S150 TR; J. Rettenmaier & Soehne GmbH+Co. KG; fiber length of 30-60 μm), maleic anhydride, allyl glycidyl ether were put in a 1 L four-necked separable flask, and stirred at 120° C. for 7 hours to allow reaction to proceed, to thereby obtain three types of oligoesterified woody materials (OEW45, OEW60 and OEW75). Results of analysis showed that the woody material compositions have characteristics shown in Table 1.

With respect to each of three oligoesterified woody materials, an amount of introduced oligoester was obtained. It was found that approximately 45%, 60% and 75% of oligoester were introduced into OEW45, OEW60 and OEW75, respectively. X-ray diffraction reveals that type-I cellulose crystals remain in cellulose of wood of all types. Corresponding to the latter result, thermoplasticity of each oligoesterified wood was not satisfactory.

Example 2

60.0 g of dried wood powder (product name: LIGNOCEL, S150 TR; J. Rettenmaier & Soehne GmbH+Co.KG; fiber length of 30-60 μm), 11.38 g of maleic anhydride, 26.62 g of allyl glycidyl ether were put in a 1 L four-necked separable flask, and stirred at 120° C. for 7 hours to allow reaction to proceed, to thereby obtain a woody material composition having an acid anhydride value of 0.16 eq/kg and an epoxy value of 0.07 eq/kg. A result of analysis showed that the woody material composition was a thermoplastic woody composition for molding of the present invention including: 74.8 g of an oligoesterified woody material (a) in which 24.6 g of oligoester chain was added per 100 g of the dried wood powder; 24.1 g of oligomer (b); 0.98 g of maleic anhydride (c); and 1.36 g of allyl glycidyl ether (c). With respect to the hot-press moldability and hot-press fluidity of this thermoplastic woody composition for molding, the analysis showed a thermal fluidity at 170° C. A hot-press fluidity was obtained by: sandwiching 5.0 g of the sample between steel plates; and subjecting the sandwiched sample to pressing at 150° C. under a gauge pressure of 75 kg/cm$^2$ for 2 minutes with a pressing machine having a ram diameter of 30 cm. The measured area of the sheet was 147 cm$^2$.

When this thermoplastic woody composition for molding was subjected to hot-press molding at 150° C. for 40 minutes, both the acid anhydride value and the epoxy value became 0 eq/kg, which confirms that polybasic acid anhydride and monoepoxy compound completely disappeared by the hot-press molding.

Subsequently, 1.5 g of the oligoesterified woody material was put in a cryogenic sample crusher (type JFC-300 manufactured by Japan Analytical Industry Co., Ltd.), and ε-caprolactone of a weight amount which is 5 times the weight of the oligoesterifiec woody material was added thereto, and allowed to stand still at room temperature for 30 minutes under dry condition. Then, crushing treatment using balls was conducted for 10 minutes (impact was given to the sample using steel balls at 60 Hz with 1450 times of vertical reciprocating motion per minute), and the treatment was further conducted for 30 minutes while deep-cooling the device by adding a dry ice-methanol freezing medium to a cooling part. Next, the device was allowed to become at room temperature, 2 wt % of tin(II) octylate relative to the total amount was dropped, dried nitrogen gas was substituted for atmosphere, and polymerization of ε-caprolactone was conducted at 140° C. X-ray diffraction of the resultant product revealed that cellulose was permanently decrystallized after these treatments. In addition, a sheet was easily formed by hot press at 60° C. and even at room temperature (25° C.), and when 2 g of the sample was subjected to hot press without a spacer, the sample exhibited such a thermal fluidity as to extend off from a 25-cm-square mirror plate, which demonstrates that the sample was completely converted into a plastic material.

Example 3

20 g of the oligoesterified woody material indicated as OEW60 in Table 1 and 40 g of an ε-caprolactone/lactide solution prepared in advance by mixing them according to a weight ratio of 6:4 were put in a 500 mL zirconia container of a planetary ball mill P-6 (manufactured by Fritsch GmbH, Germany), and ball milling was operated using zirconia balls with a diameter of 10 mm, at a rotational speed of 360-450 rpm for 30 minutes. After the operation, 1 weight % of tin(II) octylate catalyst was added and polymerization was conducted at 140° C. for 8 hours, which was excessive for polymerization (polymerization was completed in 10 minutes in a flask experiment). The product was easily molded into a film at room temperature (25° C.). A result of differential scanning calorimetry (DSC analysis) shows that the product has a glass transition point of −33.8° C., which confirms that the product is in a rubber-like state or paste state at room temperature. In addition, crystallization peaks are not observed, and it is shown that crystals of cellulose originally present in the product are not present, and that two types of oligoester, introduced as graft chain, are not self-assembled, or orderly agglomeration structure is not generated. This is also confirmed by a result of X-ray diffraction. DSC analysis also reveals that the resultant final product has stability against thermal decomposition, at least up to 200° C.

Example 4

20 g of dried wood powder (product name: LIGNOCEL, S150 TR; J. Rettenmaier & Soehne GmbH+Co.KG; fiber length of 30-60 μm) and 30 g of an ε-caprolactone/lactide solution prepared in advance by mixing them according to a weight ratio of 6:4 were put in a 500 mL zirconia container of a planetary ball mill P-6 (manufactured by Fritsch GmbH, Germany), and ball milling was operated using zirconia balls with a diameter of 10 mm, at a rotational speed of 450 rpm for 30 minutes. After the operation, 1 weight % of tin(II) octylate catalyst was added and polymerization was conducted at 140° C. for 8 hours, which was excessive for polymerization (polymerization was completed in 10 minutes in a flask experiment). The product was easily molded into a film at room temperature (25° C.). A result of differential scanning calorimetry (DSC analysis) shows that the product has a glass transition point of −37.5° C., which confirms that the product is in a rubber-like state or a paste state at room temperature. In addition, in DSC analysis, crystallization peaks are not observed, and it is shown that crystals of cellulose originally present in the product are not present, and that two types of oligoester, introduced as graft chain, are not self-assembled, or orderly agglomeration structure is not generated. This is also confirmed by a result of X-ray diffraction.

Example 5

15 g of cellulose powder (cellulose KC flock 100 manufactured by Nippon Paper Industries, Co., Ltd) and 37.5 g of an ε-caprolactone/lactide solution prepared in advance by mixing them according to a weight ratio of 6:4 were put in a 500 mL stainless container of a planetary ball mill P-5 (manufactured by Fritsch GmbH, Germany), and ball milling was operated using stainless balls with a diameter of 10 mm, at a rotational speed of 270 rpm for 30 minutes. After the operation, 1 weight % of tin(II) octylate catalyst was added and polymerization was conducted at 140° C. for 8 hours, which was excessive for polymerization (polymerization was completed in 10 minutes in a flask experiment). A result of X-ray diffraction of the product shows that subtle diffraction peaks of (002), (101) and (10-1) surfaces of the type-I cellulose crystals remain. Nevertheless, an interesting result is obtained that the product has moldability into a sheet at room temperature. In addition, crystallization peaks of caprolactone and lactide oligomer are not observed, and it is found that two types of oligoester, introduced as graft chain, are not self-assembled, or orderly agglomeration structure is not generated.

Example 6

15 g of cellulose powder (cellulose KC flock 100 manufactured by Nippon Paper Industries, Co., Ltd) and 36 g of an ε-caprolactone/lactide solution prepared in advance by mixing them according to a weight ratio of 6:4 were put in a 500 mL zirconia container of a planetary ball mill P-6 (manufactured by Fritsch GmbH, Germany), and ball milling was operated using zirconia balls with a diameter of 10 mm, at a rotational speed of 450 rpm for 30 minutes. After the operation, 1 weight % of tin(II) octylate catalyst was added and polymerization was conducted at 140° C. for 8 hours, which was excessive for polymerization (polymerization was completed in 10 minutes in a flask experiment). A result of differential scanning calorimetry (DSC analysis) shows that the product has a glass transition point of −38.03° C., which confirms that the product is in a rubber-like state or a paste state at room temperature. In addition, crystallization peaks are not observed, and it is shown that crystals of cellulose originally present in the product are not present, and that two types of oligoester, introduced as graft chain, are not self-assembled, or orderly agglomeration structure is not generated. This is also confirmed by a result of X-ray diffraction. DSC analysis also reveals that the resultant final product has stability against thermal decomposition, at least up to 230° C.

Example 7

15 g of cellulose powder (cellulose KC flock 100 manufactured by Nippon Paper Industries, Co., Ltd) and 36 g of an ε-caprolactone/lactide solution prepared in advance by mixing them according to a weight ratio of 5:5 were put in a 500 mL zirconia container of a planetary ball mill P-6 (manufactured by Fritsch GmbH, Germany), and ball milling was operated using zirconia balls with a diameter of 10 mm, at a rotational speed of 450 rpm for 35 minutes. After the operation, 1 weight % of tin(II) octylate catalyst was added and polymerization was conducted at 140° C. for 8 hours, which was excessive for polymerization (polymerization was completed in 10 minutes in a flask experiment). A result of X-ray diffraction of the product shows that diffraction peaks of (002), (101) and (10-1) surfaces of the type-I cellulose crystals completely disappear. Like Examples above, it is also found that the product has moldability into a sheet at room temperature. In addition, crystallization peaks of caprolactone and lactide oligomer are not observed, and it is found that two types of oligoester, introduced as graft chain, are not self-assembled, or orderly agglomeration structure is not generated.

The invention claimed is:

1. A method for producing a thermoplastic cellulose composition, comprising a process of ring-opening polymerization of cyclic ester with oligoesterified cellulose comprising a wood cellulosic material with hydroxyl group to which polybasic acid anhydride and monoepoxy compound are added,
   wherein the ring-opening polymerization proceeds after mechanochemical pretreatment or during mechanochemical treatment, and
   the mechanochemical treatment is conducted using any of a wet granulator, a wet vibratory ball mill and a dry mechanical compositing device.

2. A method for producing a thermoplastic cellulose composition, comprising a process of ring-opening polymerization of cyclic ester with oligoesterified cellulose comprising a wood cellulosic material, with hydroxyl group to which polybasic acid anhydride and polyhydric alcohol are added, wherein
   the ring-opening polymerization proceeds after mechanochemical pretreatment or during mechanochemical treatment, and
   the mechanochemical treatment is conducted using any of a wet granulator, a wet vibratory ball mill and a dry mechanical compositing device.

3. A method for producing a thermoplastic cellulose composition, comprising a polymerization of mixture of a wood cellulosic material and a polymerizable compound, after mechanochemical pretreatment or during mechanochemical treatment, wherein the mechanochemical treatment is conducted using any of a wet granulator, a wet vibratory ball mill and a dry mechanical compositing device.

4. The method for producing a thermoplastic cellulose composition according to claim 3, wherein the polymerizable compound is cyclic ester and the polymerization is ring-opening polymerization of the cyclic ester.

* * * * *